Figure 1:
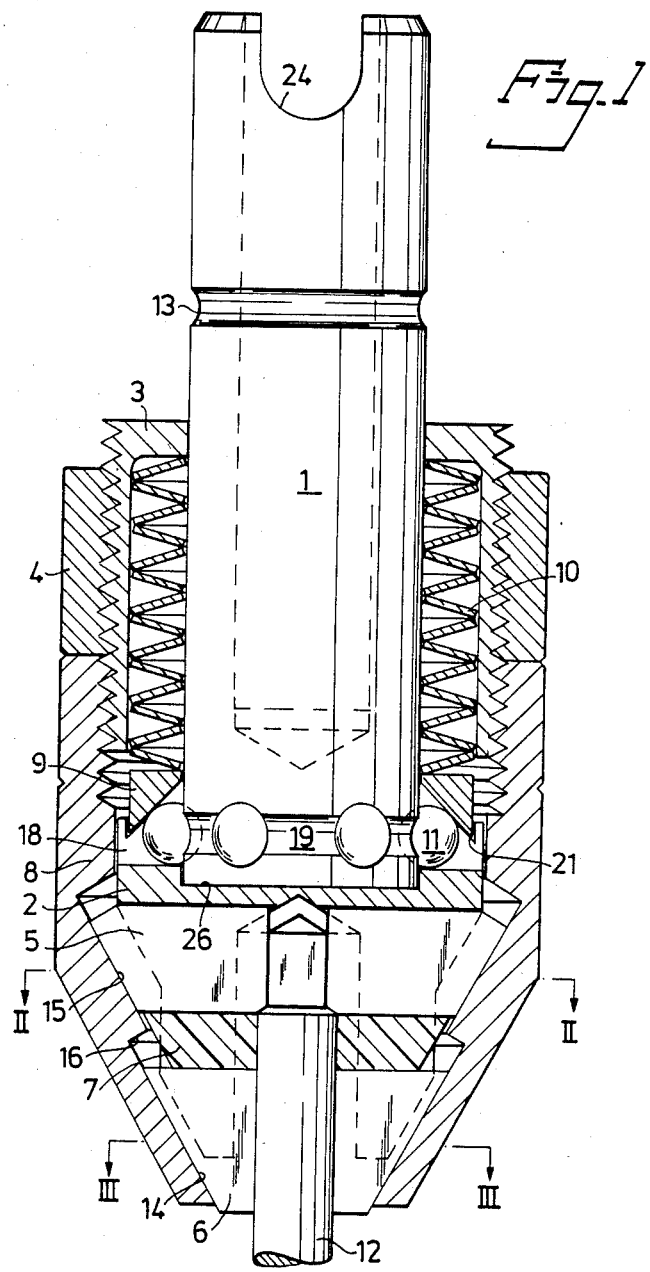

United States Patent [19]

Stenmark

[11] Patent Number: 4,669,930
[45] Date of Patent: Jun. 2, 1987

[54] TAP HOLDER

[75] Inventor: Dag Stenmark, Ödsmål, Sweden

[73] Assignee: S & L Maskin AB, Stenungsund, Sweden

[21] Appl. No.: 853,863

[22] Filed: Apr. 21, 1986

[30] Foreign Application Priority Data

May 3, 1985 [SE] Sweden ................................ 8502177

[51] Int. Cl.$^4$ ......................... B23B 47/24; B23G 1/46
[52] U.S. Cl. ................................ 408/140; 279/1 DC; 408/139; 408/141
[58] Field of Search ................ 409/234; 408/139, 141, 408/142, 140; 279/1 DC, 1 DA; 10/135 R; 192/56 R

[56] References Cited

U.S. PATENT DOCUMENTS

| | | | |
|---|---|---|---|
| 2,333,868 | 11/1943 | Kylin | 408/139 |
| 2,723,406 | 11/1955 | Angst | 408/140 X |
| 3,767,217 | 10/1973 | Jensen | 279/56 |
| 3,791,756 | 2/1974 | Johnson | 408/139 |
| 4,284,374 | 8/1981 | Senzaki | 408/139 |
| 4,514,115 | 4/1985 | Akashi | 408/139 |

FOREIGN PATENT DOCUMENTS

| | | | |
|---|---|---|---|
| 1427295 | 4/1970 | Fed. Rep. of Germany | 408/140 |
| 2328464 | 12/1974 | Fed. Rep. of Germany | 408/139 |
| 3404604 | 8/1985 | Fed. Rep. of Germany | 408/140 |
| 324095 | 5/1970 | Sweden | 408/139 |
| 757499 | 9/1956 | United Kingdom . | |
| 816346 | 7/1959 | United Kingdom . | |

Primary Examiner—William R. Briggs
Attorney, Agent, or Firm—Christel, Bean & Linihan

[57] ABSTRACT

A tap holder e.g. for threading taps, has a drive body (1) intended for connecting to the chuck of a drive motor. The driving power is transferred by a torque-limiting device (2, 9, 11) to a clamping body (8) intended to clamp the shank (12) of the threading tap. By the clamping body having outer (6) and inner (5) jaws with an intermediate elastic member (7), tool shanks of different dimensions may be accommodated by the clamping body.

8 Claims, 4 Drawing Figures

4,669,930

TAP HOLDER

TECHNICAL FIELD

The present invention relates to a tap holder, which has a drive body intended for fastening in a chuck on a rotational motor for transmitting the driving power of the motor to the shank of the tool the motor is to drive. The tool may be such as a thread tap or a drill. The drive body is connected to a clamping body for fixing the shank.

BACKGROUND ART

Tap holders of common types can usually only accommodate tools with shanks of a single dimension or have shank dimensions lying within a very tightly limited range. When it is therefore desirable to machine a workpiece with tools having different shank diameters, it has been necessary to change the entire tap holder. Thus it has been necessary for each machine to have several tap holders for tools with different shank dimensions. The assortment of tap holders has also increased due to each tool shank, e.g. those of threading taps, having two retaining surfaces, an upper quadratic section, and a circular intermediate section, which have different dimension relationships for different tools. It is, however, of importance that the tap holder grip is well suited to the retaining surfaces of the tool to obtain good power transmission to the tool and accurate working on the workpiece.

Some tap holders known per se involve an overload protection where an adjustable torque shall be transmitted between the drive body and a tool mounted in it, see for example the Swedish Pat. No. 324 095. If the tool were to fasten in the workpiece or the predetermined torque were exceeded for some other reason, power transmitting balls are pressed out of their normal positions and the power transmission between the drive body and the tool is interrupted.

The known construction is based on the tool shank being provided with grooves intended to coact with the power transmitting balls. This signifies that the known overload protection is only usable for tools with specially shaped shanks. Another disadvantage with the known overload protection is that the spring bias must be adjusted manually for each tool dimension, which is troublesome and extremely unsatisfactory, since it is difficult to achieve any definite graduation of the overload protection.

DISCLOSURE OF INVENTION

With the tap holder in accordance with the invention, the number of necessary holders is limited, due to the clamping body of the holder being formed to accommodate tool shanks of different dimensions and where the mutual dimension relationship of the shank parts do not necessitate different tap holders, and one and the same tap holder gives good retention irrespective of the dimensions of the tool shank.

This is thus achieved in accordance with the present invention in that the part of the clamping body surrounding the shank of the tool has a forward and a rearward annular conical surface with an intermediate abutment. The forward conical surface is adapted to coact with forward clamping jaws for clamping the usually circular intermediate part of the shank while the rear conical surface of the clamping body is adapted to coact with rear clamping jaws for clamping against the usually square top portion of the shank. The forward and the rear jaws are separated by an intermediate flexible means.

With that tap holder in accordance with the invention, a tool can be brought into retention in the tap holder by a simple insertion of the shank into the clamping body, independent of its shank dimensions. The different locking jaws adjust themselves automatically to the shank dimensions of the tool in question, due to the two different conical surfaces and the intermediate means made from flexible material.

To ensure uniform power transmission and good security against overloading of the tool by having an automatic adjustment of the predetermined torque for each tool dimension which can be retained in its clamping body, the clamping body of the tap holder in accordance with the invention is connected to the drive body via a driving dog coacting with a spring-biased lock ring, the ring being caused to come out of engagement with the driving dog when the resistance on the tool exceeds a predetermined torque, this being performed with the aid of plurality of balls which are mounted in a peripheral groove on the drive body.

Having conically shaped surfaces of the clamping body acting on a forward locking jaw engaging against the cylindrical body of the tool shank inserted in the clamping body, and on a rear locking jaw engaging against the square portion of the tool shank there is obtained direct sensing of the tool dimension. This is transferred to the driving dog of the clamp holder, which is in direct touch with the rear locking jaws, and transfers the position assumed in response to the tool shank dimensions to the spring via the balls and lock ring. By the setting of the jaws there is obtained the automatic setting of the torque for the tap holder, thanks to the conical surfaces.

PREFERRED EMBODIMENT

Figure 2:
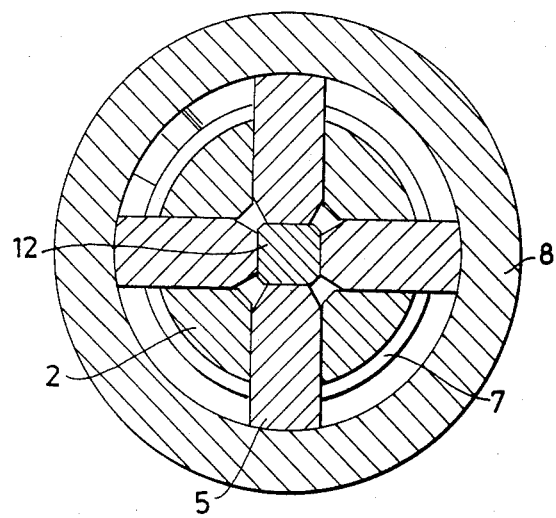
Figure 3:
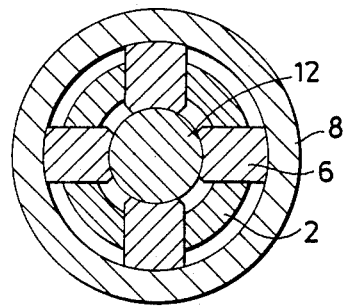
Figure 4:
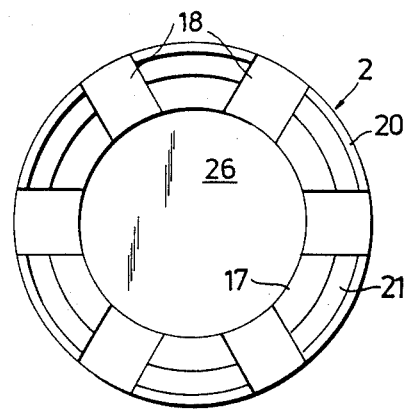

The invention will now be described in detail with reference to a preferred embodiment and with reference to the accompanying drawings, where FIG. 1 is a longitudinal section through a tap holder in accordance with the invention, FIG. 2 is a cross section II—II in FIG. 1, FIG. 3 is a cross section III—III in FIG. 1, and FIG. 4 is a plan of the tap holder driving dog.

The tap holder in accordance with the invention includes, as illustrated in FIG. 1, a drive body 1, the upper part in the preferred embodiment illustrated here is intended for applying in a chuck (not shown) with a quick-release coupling. For this purpose the drive body 1 is formed with a peripheral groove 13 and recess 24. Since this power transmission from the chuck is no part of the inventive subject, it is not described in detail here.

The drive body 1 is connected to a clamping body 8 for power transmission to the tool, the shank 12 of which is inserted in the clamping body 8. The clamping body 8 includes a part surrounding the shank 12, and for retaining the latter it is formed with a forward conical surface 14 and a rear conical surface 15. Between the conical surfaces 14, 15 there is an abutment 16. The forward surface 14 coacts with forward jaws 6 intended to clamp the intermediate part usually formed with a circular cross section on the tool shank 12, see also FIG. 3. The rear surface 15 coacts in a corresponding manner with rear jaws 5 for clamping the top part, of usually square cross section, on the tool shank 12, see also FIG.

2. A body 7 of flexible material is arranged between the forward and rear jaws 6, 5. The jaws 5, 6 and body 7 are kept in their mutual relative positions with the aid of a driving dog 2.

The driving dog 2, as will be seen from FIG. 4, has a top surface with a counterbore 26, the diameter of which corresponds to the diameter of the drive member 1 and is thus adapted to receive one end of the drive member 1. The counterbore 26 is surrounded by an annular wall 17 in which a plurality of chambers 18 are made. The number of chambers 18 corresponds to a number of balls 11 which are mounted in a peripheral groove 19 arranged in the immediate vicinity of the end of the drive member 1 thrusting into the counterbore 26. In the chamber walls 20, separating adjacent chamber 18, there is a V-shaped recess 21 for coaction with a lock ring 9.

The cross section of the lock ring 9 is substantially triangular, as will be seen from FIG. 1, with a right angle so that one side of it is parallel to the inside of the part of the clamping body 8 surrounding the drive body 1. The triangle side opposite the right angle (i.e. the hypotenuse) engages against the balls 11, while the remaining triangle side is loaded by belleville washers 10. The lock ring 9 is thus biased by the belleville washers 10 so that normally it is in engagement with the driving dog 2 via the recess 21.

The abutment to the washers 10 is a guide sleeve 3, whereby the spring bias is adjustable by having the guide sleeve 3 threaded into the part of the clamping body 8 surrounding the drive body 1. In the same thread as the guide sleeve 3 there is also threaded a stop collar 4 with which the guide sleeve 3 is locked to the clamping body 8.

The tap holder in accordance with the invention thus has the following function.

Driving power from the chuck (not illustrated) is taken via the drive body 1 to the balls 11, which are kept in by the belleville washers 10 and lock ring 9, further to the driving dog 2 in which there are the clamping jaws 5, 6. Clamping of the shaft 12 is obtained by the spring bias in the belleville washers 10 which press the driving dog 2 and locking jaws 5, 6 forwards in the conical part of the clamping body 8, gripping force on the shank 12 thus being obtained. The clamping jaws 5, 6 are kept together by the flexible means 7, which enables both parts to adjust themselves to different conditions between the circular and square parts of the shank 12.

If the resistance on the tool, and thereby on the shank 12 exceeds a desired torque, the balls 11 are forced outwards and lift the lock ring 9 so that the drive body 1 rotates freely.

The guide sleeve 3 is screwed into the clamping body 8, which is locked by the stop collar 4, so that desired spring bias against the lock ring 9 is obtained.

For different shank dimensions, the clamping jaws 5, 6 will come to different heights in the conical part of the clamping body 8, which causes the spring bias against the lock ring 9 to change and consequently the predetermined driving torque.

The tap holder described above may be modified in different ways without departing from the inventive concept. For example, the number of jaws 5, 6 may be more or less than the four of each illustrated in FIGS. 2 and 3. Similarly, the jaws 5, 6 may have a cross section other than the one illustrated. The member 7 made from flexible material may be annular or may consist of a plurality of individual bodies. The clamping body 8 may also retain a tool shank 12 having another cross sectional form than the above-mentioned square and circular cross sections. The tap holder lock ring 9 may, of course, be given a cross section other than the illustrated triangular one, and the spring bias can be provided with other means than the illustrated belleville washers 10. Thus, the invention may not be regarded as limited to the preferred embodiment described above and illustrated on the drawings, but only to the following claims.

I claim:

1. A tap holder including a drive body (1) intended to be fixed into a chuck on a rotational motor and adapted for transmitting the motor driving power to the shank (12) of the tool which the motor is to drive, the drive body (1) being connected to a clamping body (8) for retention of the shaft, said tap holder being characterized in that the part of the clamping body (8) surrounding the shank (12) has a forward and a rear annular conical surface (14 and 15) with an intermediate abutment (16), the forward conical surface (14) being adapted for coaction with forward clamping jaws (6) for clamping against the usually circular intermediate part of the shaft, and the rear conical surface (15) being adapted to coact with rear jaws (5) for clamping against the usually square top portion of the shank, said forward and rear jaws (6, 5) being separated by an intermediate flexible member (7).

2. The tap holder as claimed in claim 1, characterized by a driving dog (2) formed such as to thrust in through, but free from, the part of the clamping body (8) surrounding the shank (12), the driving dog forming intermediate support portions for the respective forward and rear jaws (5, 6) each of which has a disc-shaped cross section.

3. The tap holder as claimed in claim 2, characterized in that there are four rear jaws (5) and four forward jaws (6), the jaws being arranged in pairs diametrically opposite each other.

4. A tap holder involving an overload clutch including a drive body (1) intended for mounting in a chuck on a rotational motor and adapted to transmit the motor driving power to the shank (12) on the tool the motor is to drive, the drive body (1) being coupled to a clamping body (8) for retaining the shaft, and the power transmission from the drive body (1) being arranged to take place via a driving dog (2), which is in engagement with a spring biased (via 10) lock ring (9), balls (11) in a groove (19) on the surface of the drive body (1) being forced out of the groove when resistance to turning of the shank (12) during operation exceeds a predetermined torque and causes the lock ring (9) to leave its engagement with the driving dog (2) so that the power transmission is interrupted, characterized in that said predetermined torque is automatically adjustable when the shank (12) is gripped by the clamping body (8) in relation to the shank diameter and its square top portion by the clamping body (8) having a conical surfaces (14,15) for forward and rear clamping jaws (6,5) having a flexible member (7) therebetween, movement of the jaws (6,5) being coupled through the flexible member (7) to adjust the spring bias (via 10) due to the diameter and square dimensions of the shank (12) to a force answering thereto and corresponding to the predetermined torque required for a particular size of the shank.

5. The tap holder as claimed in claim 4, characterized in that the rear clamping jaws (5) engage against the driving dog (2), which is in engagement with the lock ring (9), against which a spring (10) is biased with the aid of an abutment surface (via 3) arranged on the clamping body (8).

6. The tap holder as claimed in claim 4, characterized in that the forward clamping jaws (6) are arranged to engage against the circular cylindrical part of the shank (12) and that the rear clamping jaws (5) engage against the square-shaped part of the shank (12), the rear clamping jaws (6) being in direct communication with the driving dog (2) and actuated in relation to the dimensions of the shank (12) on the circular-cylindrical and square shaped parts.

7. The tap holder as claimed in claim 4, characterized in that the inner end of the driving dog (2) surrounds the driving body (1) and at the groove (19) for the balls (11) forms open chambers (18), each one accommodating a ball, intermediate walls (20) of said chambers having a V-shaped recess (21) in which the lock ring (9), formed with a right-angular triangle cross section, normally thrusts so that the side of the lock ring cross section corresponding to the hypotenuse is in contact with the balls, which force the lock ring out of the recess on the increased resistance to rotation of the shank (12).

8. The tap holder as claimed in claim 4, characterized in that the basic force of the spring bias (via 10) is adjustable by a guide sleeve (3) threaded into a portion of the clamping body (8) surrounding the drive body (1), the guide sleeve being lockable with the aid of a stop collar (4) threaded onto the guide sleeve into engagement against the clamping body.

* * * * *